(12) United States Patent
Umezaki et al.

(10) Patent No.: US 10,179,523 B2
(45) Date of Patent: Jan. 15, 2019

(54) ROTATION MOVEMENT CONTROL MECHANISM AND SEAT

(71) Applicant: Delta Tooling Co., Ltd., Hiroshima-shi (JP)

(72) Inventors: Kiyonori Umezaki, Hiroshima (JP); Katsuhiro Inoue, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 88 days.

(21) Appl. No.: 15/519,427

(22) PCT Filed: Oct. 15, 2015

(86) PCT No.: PCT/JP2015/079381
§ 371 (c)(1),
(2) Date: Apr. 14, 2017

(87) PCT Pub. No.: WO2016/060269
PCT Pub. Date: Apr. 21, 2016

(65) Prior Publication Data
US 2017/0240071 A1 Aug. 24, 2017

(30) Foreign Application Priority Data
Oct. 16, 2014 (JP) .................................. 2014-211639

(51) Int. Cl.
*B60N 2/22* (2006.01)
*A47C 1/025* (2006.01)
*B60N 2/90* (2018.01)

(52) U.S. Cl.
CPC ............ *B60N 2/2231* (2013.01); *A47C 1/025* (2013.01); *B60N 2/2227* (2013.01); *B60N 2/938* (2018.02); *B60N 2205/20* (2013.01)

(58) Field of Classification Search
CPC .... B60N 2/2231; B60N 2/938; B60N 2/2227; B60N 2205/20; A47C 1/025
(Continued)

(56) References Cited

U.S. PATENT DOCUMENTS

| 4,685,735 A | * | 8/1987 | McFalls | B60N 2/2231 |
| | | | | 297/361.1 |
| 5,295,730 A | * | 3/1994 | Rees | B60N 2/2231 |
| | | | | 297/354.12 |

(Continued)

FOREIGN PATENT DOCUMENTS

| DE | 44 22 529 A1 | 5/1995 |
| JP | 61-101493 U | 6/1986 |

(Continued)

OTHER PUBLICATIONS

International Search Report dated Jan. 12, 2016 in PCT/JP2015/079381 filed Oct. 16, 2015.

*Primary Examiner* — Mark R Wendell
(74) *Attorney, Agent, or Firm* — Oblon, McClelland, Maier & Neustadt, L.L.P.

(57) ABSTRACT

A structure in which two worm wheels are disposed across a worm provides an increase in locking reliability while maintaining stable operation during rotation. At the time of rotation, respective rotating fulcrums set at both end portions in an axial direction of a worm are supported by bearing parts. At the time of locking, a locking fulcrum set at an eccentric position on one end portion in the axial direction of the worm is supported by one bearing part, while on the other end portion in the axial direction, the rotating fulcrum is supported by the other bearing part as is. As a result, the angle of lead of the worm supported by the pair of bearing parts is changed between the time of rotation and the time of locking and becomes smaller at the time of (Continued)

locking than at the time of rotation, whereby an increase in locking reliability can be achieved.

13 Claims, 15 Drawing Sheets

(58) Field of Classification Search
 USPC .................................................. 297/361.1
 See application file for complete search history.

(56) References Cited

U.S. PATENT DOCUMENTS

| | | | |
|---|---|---|---|
| 5,590,562 A | 1/1997 | Scheck et al. | |
| 2003/0160489 A1* | 8/2003 | Sakamoto | B60N 2/2231 |
| | | | 297/354.12 |
| 2004/0135414 A1* | 7/2004 | Weckner | A47C 3/30 |
| | | | 297/344.19 |
| 2006/0006717 A1* | 1/2006 | Sakamoto | B60N 2/2231 |
| | | | 297/361.1 |
| 2009/0146478 A1 | 6/2009 | Sakamoto et al. | |
| 2010/0244525 A1* | 9/2010 | Ito | B60N 2/0232 |
| | | | 297/353 |
| 2015/0329020 A1* | 11/2015 | Ito | B60N 2/0296 |
| | | | 297/463.1 |
| 2016/0169327 A1 | 6/2016 | Fujita et al. | |
| 2018/0213936 A1* | 8/2018 | Sasaki | A47C 1/024 |

FOREIGN PATENT DOCUMENTS

| | | |
|---|---|---|
| JP | 2003-319849 A | 11/2003 |
| JP | 2007-130455 A | 5/2007 |
| WO | 2007/043233 A1 | 4/2007 |
| WO | 2007/043628 A1 | 4/2007 |
| WO | 2015/001846 A1 | 1/2015 |

* cited by examiner

ND SEAT

ROTATION MOVEMENT CONTROL MECHANISM AND SEAT

TECHNICAL FIELD

The present invention relates to a rotation movement control mechanism for allowing the rotation between members that relatively rotate or locking the members at any angle, particularly relates to a rotation movement control mechanism between frames that are attached to a seat of a vehicle or the like and relatively rotate in a plurality of frames composing the seat, and particularly relates to a rotation movement control mechanism that is suitable for a reclining adjuster for adjusting an inclination angle of a seat back with respect to a seat cushion appropriately. In addition, the present invention relates to a seat incorporated with the rotation movement control mechanism.

BACKGROUND ART

Patent Document 1 and Patent Document 2 disclose as a lock mechanism for when a seat back is stopped at a predetermined inclination angle, a technique using a slide member that contacts with a tooth surface of a worm and stops the rotation of the worm by friction, and a technique that moves the worm itself in parallel to a worm wheel and pushes the worm against the worm wheel to stop the rotation of the worm by friction. This structure requires a large pushing force in order to acquire necessary locking force.

Between teeth of the worm and worm wheel, backlash exists for smooth rotation movement. However, this backlash may be a factor generating looseness and abnormal sounds at the time of locking of the seat back.

However, for smooth rotation movement of the worm and the worm wheel, a size of the backlash must be adjusted on the basis of a certain engagement relationship by strictly aligning a bearing that pivotally supports both end portions in an axial direction of the worm. Since the backlash is changed by manufacturing errors of the worm or the like, abrasion and deformation of the teeth used, or the like, reducing variation for every product is difficult. Even when, at the time of locking, the worm is pushed against the worm wheel, a clearance is kept generated between teeth of the worm and the worm wheel along a thrust direction of the worm and the clearance may be a factor generating looseness and abnormal sounds at the time of locking.

On the other hand, the present applicant suggests following mechanisms in Patent Document 3 and Patent Document 4 as a mechanism capable of eliminating even the clearance in the thrust direction of the worm at the time of locking.

That is, Patent Document 3 suggests a reclining adjuster in which a worm formed with dent portions in both end surfaces is used, a bearing including a dent portion in an opposite surface with the worm is fixed in a bracket, and a support mechanism of the worm loaded with a ball between the worm and the bearing is adopted. When the reclining adjuster stops a seat back at a predetermined inclination angle, teeth portion of the other end side in an axial direction of the worm is pushed against a worm wheel by a pushing means and is locked. Patent Document 4 suggests a mechanism in which, in order to make a movable range of the worm larger than the technique of Patent Document 3, a movable bearing that moves vertically is provided in the other end side in an axial direction and the movable bearing is moved vertically and is pushed against the worm wheel.

PRIOR ART DOCUMENT

Patent Document

Patent Document 1: German Patent Application Publication No. DE4422529A1
Patent Document 2: U.S. Pat. No. 5,590,562
Patent Document 3: Japanese Patent Publication Application 2003-319849
Patent Document 4: Japanese Patent Publication Application 2007-130455

SUMMARY OF THE INVENTION

Problem to be Solved by the Invention

According to the mechanism of Patent Documents 3 and 4, when a seat back is locked, other end side in the axial direction rotates in the worm wheel side having the one end side in the axial direction as a center and the worm is pushed against the worm wheel in a state where an axis core of the worm is inclined. As a result, by a ball, to the worm, a force in the one end direction in the axial direction is applied with respect to the other end side in the axial direction and the worm is displaced also in the thrust direction. Thereby, not only eliminating the backlash, but also eliminating the clearance in the thrust direction of the worm can be performed and generating of looseness and abnormal sounds of the seat back caused by the clearance can be prevented. Patent Document 4 discloses a structure in which a latch member that engages an engagement groove engraved on a surface of the teeth of the other end side in the axial direction of the worm is provided. By this latch member engaging with the engagement groove, lock is reliably performed.

However, in the techniques disclosed in Patent Documents 1 to 4, while the worm can be displaced in a direction that is substantially orthogonal to the axial direction of the worm, all of them is a mechanism in which the worm is pushed against the worm wheel side at the time of locking. Thus, in a state where the worm at the time of normal rotation movement is not pushed as at the time of locking, the worm needs to be borne at a predetermined position so that the worm can rotate by engaging with the worm wheel. If the position of the worm is not correct, whirling vibration that is like vertical flapping of each end portion in the axial direction is generated in the worm by the rotation of the worm itself, an adverse effect is generated also in the rotation movement of the worm itself, and smooth rotation movement of the seat back can be disturbed. In the configurations of Patent Documents 3 and 4, at the time of locking, lock is performed by engaging an engaging member with an engagement groove engraved on a peripheral surface of the worm. Therefore, rotation stop of the worm is performed for every interval of the engagement groove and the worm cannot be stopped at a stepless position.

In consideration of the above, the present applicant suggests a mechanism in which two worm wheels are arranged across the worm, the worm rotates by being applied with a driving force of a driving worm wheel that supports an rotation axis of the seat back and is arranged in a lower portion when a first member and a second member relatively rotate, for example, when the seat back is inclined with respect to a seat cushion, backlash between both is reduced by pushing a driven worm wheel arranged in an upper portion against the worm at the time of locking, in the International Application Number: PCT/JP2014/062645. According to this mechanism, at the time of rotation, the worm rotates relatively by the torque of the driving worm wheel, the driven worm wheel rotates by the torque of the worm, and the torque of the driven worm wheel is regenerated to the worm. Thus, the whirling vibration of the worm is prevented and the rotation movement of the worm becomes smooth. At the time of locking, teeth contact with each other by surface by the driven worm wheel being pushed against the worm. That is, one tooth intrudes to the other tooth like a wedge, backlash can be reduced more reliably than the ones disclosed in Patent Documents 1 to 4, and lock can be performed at a stepless position.

Although the suggestion of the present applicant in the International Application Number: PCT/JP2014/062645 has a superior function as above, as a result of further research by the present applicant, it is found that, there is a case, when a seat back is applied with a load repeatedly in a locked state, depending on a size of the load and its frequency, the seat back inclines slightly rearward or forward, that is, the driven worm wheel supported by the seat back slightly rotates and thereby, a phenomenon in which the worm slightly rotates is observed.

The present invention has been made in consideration of the above and has a problem of providing a rotation movement control mechanism and a seat in which, while stable movement during rotation is maintained by a structure in which two worm wheels are arranged across the worm, rotation of the worm is prevented even when a predetermined external force or more is applied at the time of locking, and reliability of lock can be further improved.

Means for Solving the Problem

In order to solve the problem, the rotation movement control mechanism of the present invention controls a second member rotatably with respect to a first member and can maintain the second member at an appropriate rotation angle. Any of the first member and the second member has a worm pivotally supported between one pair of bearing parts arranged at both end portion in an axial direction, and a driving worm wheel arranged in any one of the first member and the second member and a driven worm wheel provided in the other of the first member and the second member so as to engage with the worm in a positional relationship across the worm. When the first member and the second member are relatively rotated, the worm engaging with the driving worm wheel rotates and the driven worm wheel engaging with the worm rotates. At the time of locking, lock can be performed in a state where backlash between both is reduced by moving the driven worm wheel in a direction of being pushed against the worm. Moreover, the mechanism has rotating fulcrums that are provided in both end portions of the axial direction and are fulcrums when the worm rotates, and a locking fulcrum that is provided in a different position from the rotating fulcrums in the one end portion in the axial direction. At the time of rotation, each of the rotating fulcrums in the both end portions in the axial direction is supported by the pair of bearing parts. At the time of locking, by the worm being displaced in the axial direction according to the movement to the direction in which the driven worm wheel is pushed against the worm, the locking fulcrum is supported in the one end portion of the axis side and the rotating fulcrums are supported in the other end portion of the axis side, by the pair of bearing parts. An angle of lead of the worm at the time of locking is changed to be smaller than an angle of lead at the time of rotation.

It is preferable that each of the rotating fulcrums of the worm is provided at each of center positions of both end portions in the axial direction and the locking fulcrum is provided at an eccentric position in the one end portion in the axial direction.

The mechanism is preferably configured so that a circumference of the rotating fulcrums provided in the one end portion in the axial direction of the worm has a groove portion formed circumferentially, the eccentric position of the one bearing part disposed in the one end portion side in the axial direction is formed with a protruding part that protrudes in the groove portion direction, and the locking fulcrum is any portion of the groove portion with which the protruding part contacts.

The mechanism is preferably configured so that the one bearing part arranged in the one end portion side in the axial direction of the worm has an elastic part that elastically supports the rotating fulcrums, the elastic part is flexed in the axial direction by the worm being displaced in the axial direction at the time of locking, and thereby, the supporting position of the one bearing part in the one end portion in the axial direction of the worm is changed from the rotating fulcrums to the locking fulcrum.

The one bearing part arranged in the one end portion side in the axial direction of the worm is preferably configured so that tip end portions of the rotating fulcrums have a bearing holder having a through hole that can protrude outward, and a rotation control cam that contacts with the tip end portions of the rotating fulcrums protruding from the through hole, at the time of rotation of the worm, and is formed in a shape that separates at the time of locking.

The mechanism is preferably configured to have a locking push member that pushes a surface of the driven worm wheel at the time of locking.

The mechanism is preferably configured so that the mechanism includes a clutch plate having an inclined surface formed on a surface opposite to at least one surface of the driven worm wheel, a member installed between the driven worm wheel and the clutch plate supports the locking push member, and when the clutch plate rotates at the time of locking, the inclined surface brings the locking push member into pressure contact with the opposite surface of the driven worm wheel.

The driven worm wheel is preferably configured so that the driven worm wheel is supported rotatably via an eccentric shaft having an eccentric position from the center position of the driven worm wheel as a rotation center, when the eccentric shaft is rotated, the driven worm wheel is pushed against the worm, and thereby backlash between both is reduced and transmission of the torque is limited.

The driven worm wheel is preferably configured so that the driven worm wheel has a larger mass than that of the worm, a force corresponding to the mass of the driven worm wheel is applied to the worm, and the whirling vibration of the worm is prevented.

The first member and the second member preferably are two members that relatively rotate in a plurality of members composing the seat, and are used as for the seat.

It is preferable that the first member is any of members composing the frame of the seat cushion, and the second member is any of members composing the frame of the seat back, and is used as a reclining adjuster that adjusts an inclination angle of the seat back with respect to the seat cushion.

The seat of the present invention is characterized in that, in a seat including a seat cushion and a seat back, any of the rotation movement control mechanisms described above is provided between two members that relatively rotate in a plurality of members composing the seat.

The rotation movement control mechanism is preferably provided as a reclining adjuster between any of members composing the frame of the seat cushion and any of members composing the frame of the seat back.

Effect of the Invention

The present invention has a worm, a driving worm wheel arranged across the worm, and a driven worm wheel. Accordingly, when the second member is relatively rotated with respect to the first member, the worm relatively rotates by the torque of the driving worm wheel, the driven worm wheel rotates by the torque of the worm, and the torque of the driven worm wheel is regenerated to the worm. Thereby, the whirling vibration of the worm is prevented, the rotation movement of the worm becomes smooth, and the relative rotation of the second member with respect to the first member is performed smoothly.

In the present invention, while, at the time of rotation, each of the rotating fulcrums set in both end portions in the axial direction of the worm is supported by the bearing part, at the time of locking, the locking fulcrum set at the eccentric position in the one end portion in the axial direction of the worm is supported by one bearing part and the rotating fulcrums are supported by the other bearing part in the other end portion in the axial direction as it is. As a result, at the time of rotation and at the time of locking, the angle of lead of the worm supported by the pair of bearing parts is changed and the angle of lead at the time of locking becomes smaller than that at the time of rotation. Thus, even when the torque is input from the driven worm wheel, the worm cannot rotate, and thereby reliability of locking becomes higher. For example, inclination at the time of locking of the seat back described above of when the present invention is applied to a reclining adjuster can be prevented. Since the angle of lead of the worm at the time of locking becomes small, when, for example, a large load is input to the seat back due to the rear collision or the like, a component force in a horizontal direction applied to the driven worm wheel becomes small. Thus, engagement with the worm is easy to be maintained. That is, even when the worm and each worm wheel receive a predetermined impact or more, the engagement is maintained, and therefore, by these three gears being rotated forcibly by the large load, the seat back is gradually inclined and this contributes to mitigating the impact received by the occupant. The shape of each frame composing the seat back and the seat cushion is easy to be maintained and escapability of the occupant to the outside can be improved.

DESCRIPTION OF THE EMBODIMENTS

Figure 1:
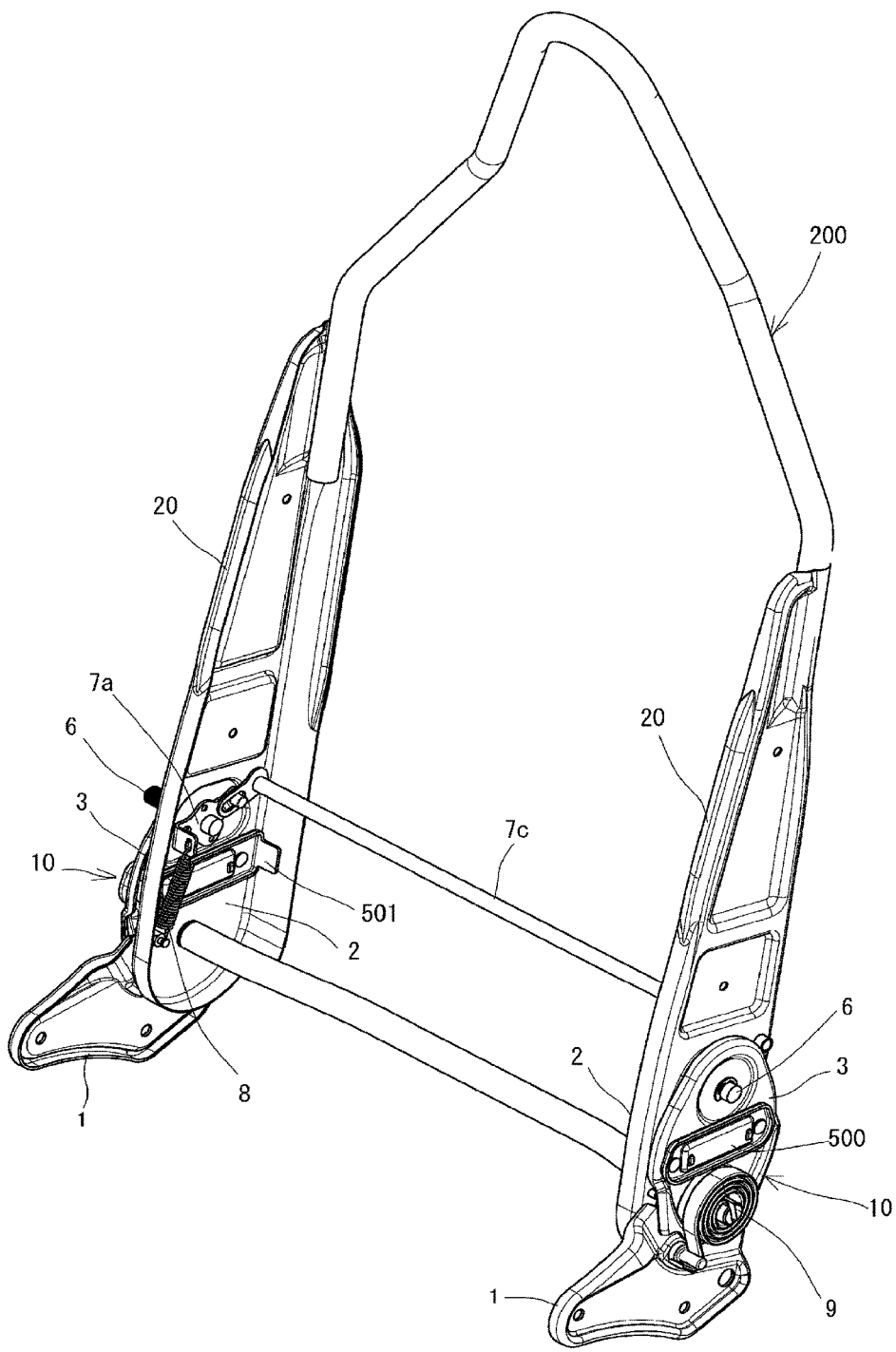
FIG. 1 is a perspective view showing a configuration of a back frame in which a reclining adjuster according to an embodiment of the present invention is attached.

Following further describes the present invention in detail on the basis of the embodiments shown in the drawings. The present embodiment will be described with an example of a reclining adjuster 10 of a seat that is a typical example of a rotation movement control mechanism of the present invention. As shown in FIG. 1 to FIG. 7, the reclining adjuster 10 of the present embodiment includes: a cushion side bracket 1 that serves as a first member (corresponding to "any of members composing a frame of a seat cushion") attached to a rear part of a side frame composing a cushion frame of the seat cushion; and a back side attachment part 2 corresponding to a lower portion of a side frame 20 composing a back frame 200 of the seat back that serves as a second member, and a cover bracket 3 that covers the back side attachment part 2 (corresponding to "any of members composing a frame of a seat back").

The cushion side bracket 1 is attached to a rear part of the side frame of the seat cushion frame by a bolt or the like. The cushion side bracket 1 is fixed with a driving worm wheel 40 by, for example, welding. A part of a circumferential direction of this driving worm wheel 40 protrudes in an upper portion of the cushion side bracket 1. Teeth formed in a circumference of this protruding range is a used range of the driving worm wheel 40. The driving worm wheel 40 may be a gear formed with teeth in the entire circumference and may be a sector gear formed with teeth only in the used region. In addition, both of the driving worm wheel 40 and a driven worm wheel 60 described later include a case where a helical gear is used as the worm wheel.

In the back side attachment part 2 and the cover bracket 3, in a position corresponding to a substantially center portion of the height direction of the cover bracket 3, connection holes 2c, 2d, 3c, and 3d are formed. The back side attachment part 2 and the cover bracket 3 are connected with predetermined intervals via connection rivets 4, 4 between the corresponding connection holes 2c and 3c and between the connection holes 2d and 3d. In between the connection holes 2c, 2d of the back side attachment part 2 and between the connection holes 3c, 3d of the cover bracket, worm installment holes 2e, 3e that are long in width directions of the back side attachment part 2 and the cover bracket 3 (front and back direction of the seat) are formed, respectively. In these worm installment holes 2e, 3e, a worm 50 is arranged. Particularly, the worm 50 is arranged so that the axial direction of the worm 50 is along the longitudinal direction of the worm installment holes 2e, 3e, and the worm 50 is arranged so as to engage with the driving worm wheel 40 described above.

Figure 5:
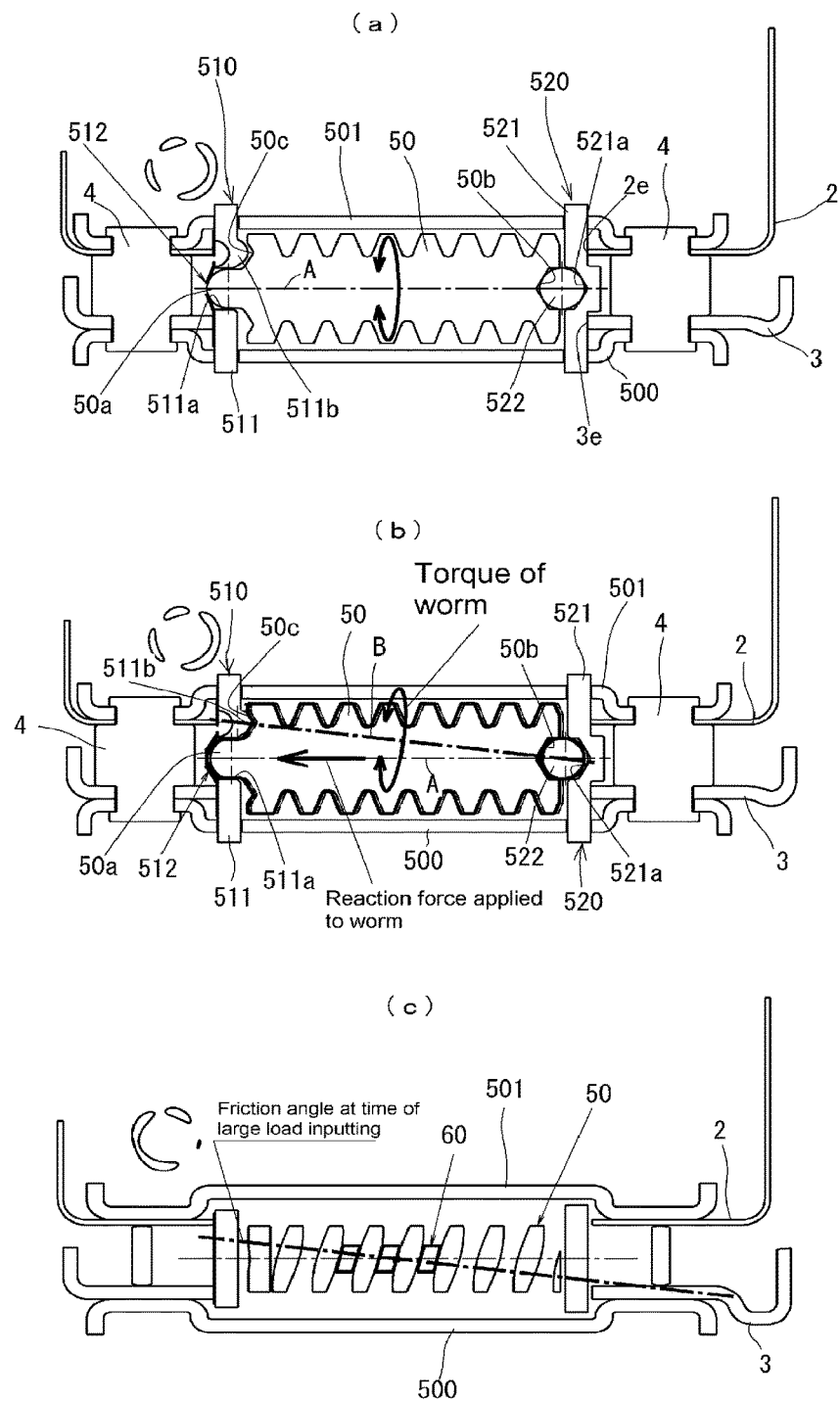
FIG. 5(a) is a diagram viewed along arrows I-I in FIG. 4 for explaining an act of the worm at the time of rotation.
FIG. 5(b) is a diagram viewed along arrows I-I in FIG. 4 for explaining an act of the worm at the time of locking.
FIG. 5(c) is a diagram viewed along arrows II-II in FIG. 4 for explaining an act of the worm of when the large load is input at the time of locking.
Figure 6:
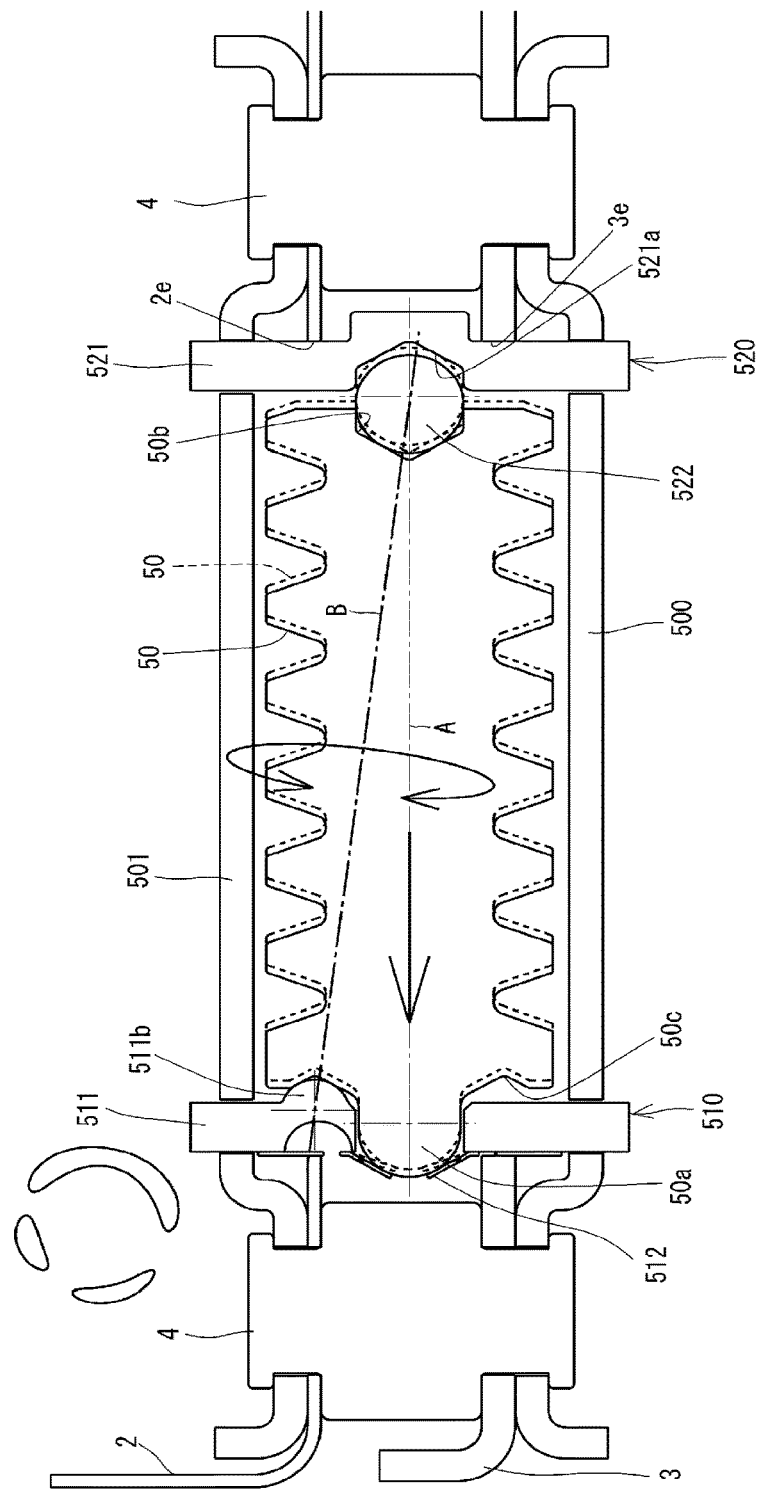
FIG. 6 is an enlarged diagram viewed along arrows I-I in FIG. 4 shown by combination of the state of the worm at the time of rotation (broken line) and the state of the worm at the time of locking (solid line).

As shown in FIG. 5 and FIG. 6, both end portions in the axial direction of the worm 50 are supported by a pair of bearing parts 510, 520 installed in both end portions of the worm installment holes 2e, 3e. Both side surfaces of the worm 50 installed in the worm installment holes 2e, 3e are covered by covers 500, 501. One bearing part 510 that is a front side in the front and back direction of the seat has a bearing holder 511 formed of a plate-like body installed in one end portion (front end portion) of the worm installment holes 2e, 3e and a leaf spring 512 that is stacked and installed on an outer surface of the bearing holder 511. In a substantially center portion of the bearing holder 511 of one bearing part 510, a bearing hole 511a that extends through the bearing holder 511 in a thickness direction is provided. In a substantially center portion of the one end portion (front end portion) of the worm 50, an axis part 50a that protrudes forward is provided. This axis part 50a is inserted to the bearing hole 511a and a tip end of the axis part 50a contacts with the leaf spring 512.

The other bearing part 520 that is a back side in the front and back direction of the seat is configured to have: a bearing holder 521 formed of a plate-like body installed in the rear end portion of the worm installment holes 2e, 3e; and a ball 522. A substantially center portion of the bearing holder 521 of the other bearing part 520 is formed with a holder side bearing groove 521a. In a substantially center portion of a surface of the other end portion side (rear end surface) of the worm 50 is formed with a worm side bearing groove 50b. The ball 522 is loaded between the holder side bearing groove 521a and the worm side bearing groove 50b.

Since the worm 50 is supported in this way, at the time of rotation when the back frame 200 is inclined with respect to the cushion frame (cushion side bracket 1), the axis part 50a located at the substantially center portion supported by the bearing hole 511a of one bearing part 510 is a fulcrum (rotating fulcrum) of the one end portion (front end portion) side, and the worm side bearing groove 50b that contacts with the ball 522 supported by the other bearing part 520 is a fulcrum (rotating fulcrum) of the other end portion (rear end portion) side (see FIG. 5(a) and FIG. 6).

On the other hand, a groove portion 50c is formed in a surface (front end surface) of the one end portion (front end portion) side of the worm 50, in an eccentric position, that is, in an outer circumference of the axis part 50a protruded in the substantially center portion, circumferentially. In one bearing part 510, at an eccentric position that is closer to the outward than the bearing hole 511a formed in the substantially center portion, a protruding part 511b is formed so as to protrude toward the groove portion 50c of the worm 50. The worm 50 is displaced in the axial direction when a driven worm wheel 60 described later comes close to the axial direction from a substantially orthogonal direction and teeth surfaces contact with each other. In the present embodiment, the worm 50 is set to be displaced to the front of the axial direction. Therefore, at the time of locking, when the worm 50 is displaced forward in the axial direction, the axis part 50a pushes and bends the leaf spring 512 and the protruding part 511b engages with the groove portion 50c of the worm 50. Thereby, at the time of locking, the worm 50 is displaced from a state shown by a broken line in FIG. 6 to a state shown by a solid line in FIG. 6. The one end portion of the worm 50 becomes a fulcrum (locking fulcrum) by the groove portion 50c being borne by the protruding part 511b (see FIG. 5(b)). The other end portion (rear end portion) of the worm 50 maintains a fulcrum that contacts with the ball 522 in which the worm side bearing groove 50b that is the rotating fulcrum is supported by the other bearing part 520 as it is also at the time of locking.

Accordingly, the worm 50 is supported by the pair of bearing parts 510, 520 at the time of rotation in between the rotating fulcrums along a center line A as shown in FIG. 5(a) (state shown by the broken line in FIG. 6). However, at the time of locking, the worm 50 is supported along a locking axis line B connecting the locking fulcrum at the one end portion side and a rotating fulcrum at the other end portion side as shown in FIG. 5(b) (state shown by the solid line in FIG. 6). Thus, an angle of lead of engagement between the worm 50 and each of the worm wheels 40, 60 becomes smaller at the time of locking than at the time of rotation. Therefore, even when the torque is input from the driven worm wheel 60, the worm 50 is harder to rotate than conventional techniques.

Figure 3:
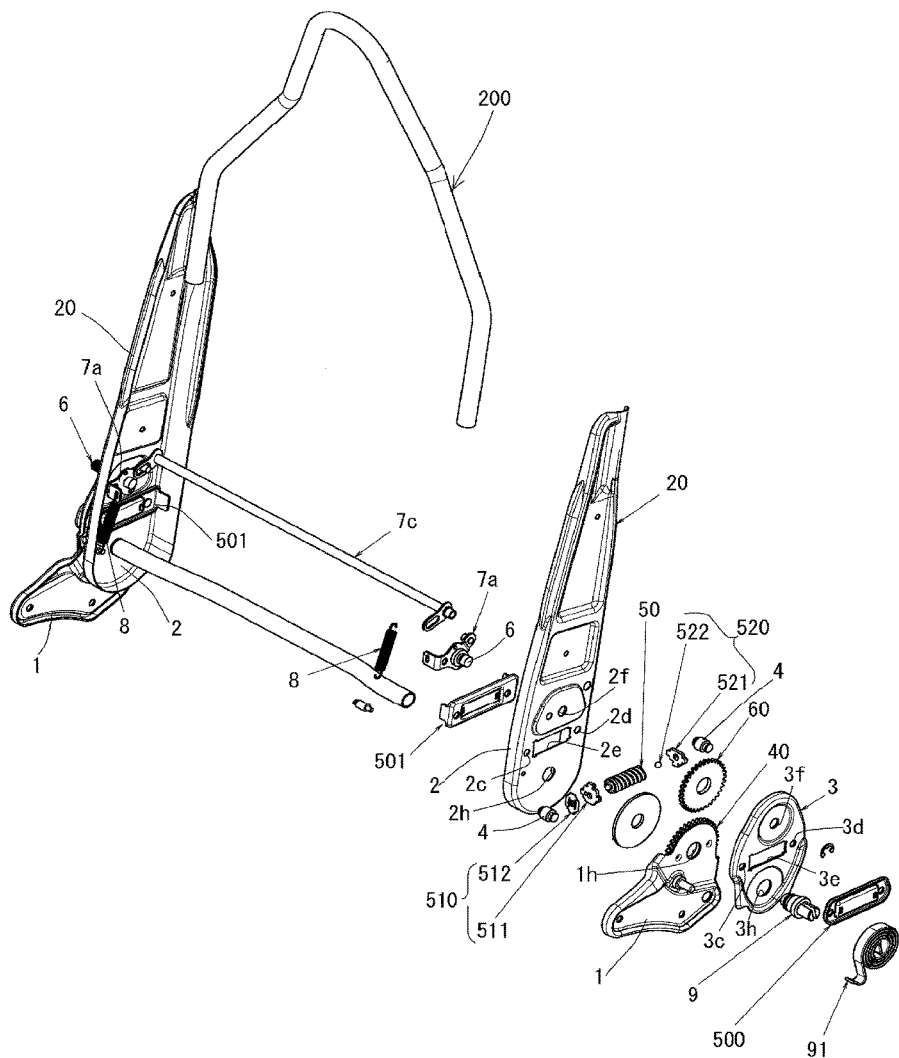
FIG. 3 is an exploded perspective view of FIG. 1.
Figure 4:
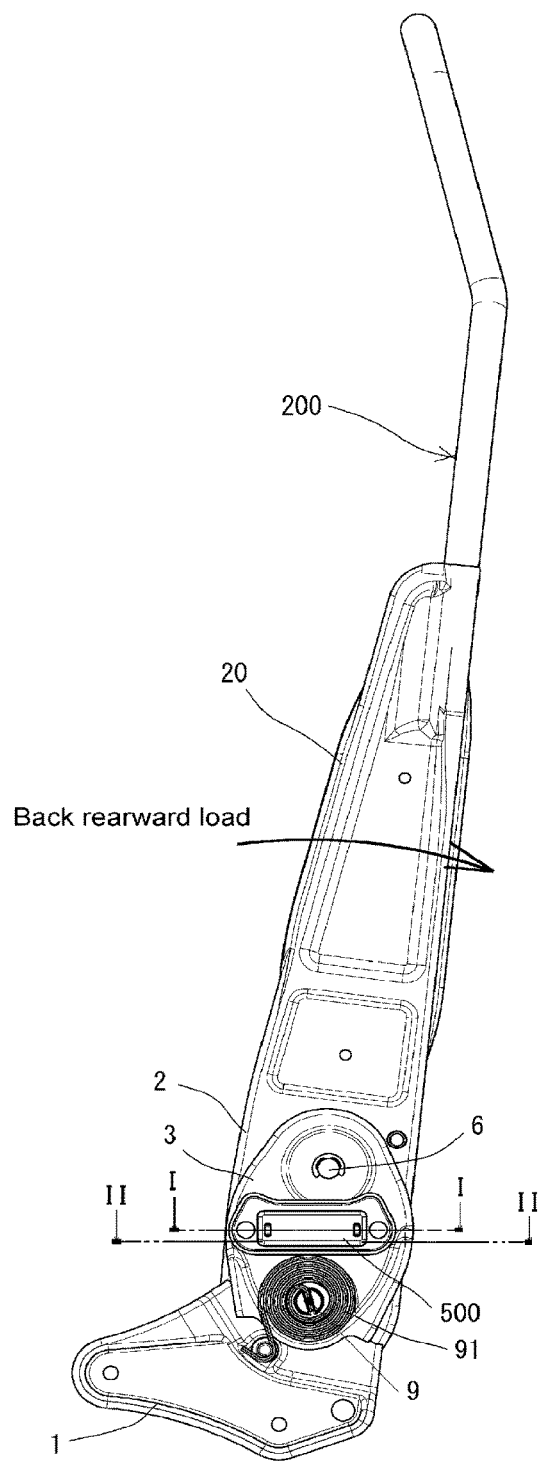
FIG. 4 is a side view of FIG. 1.
Figure 7:
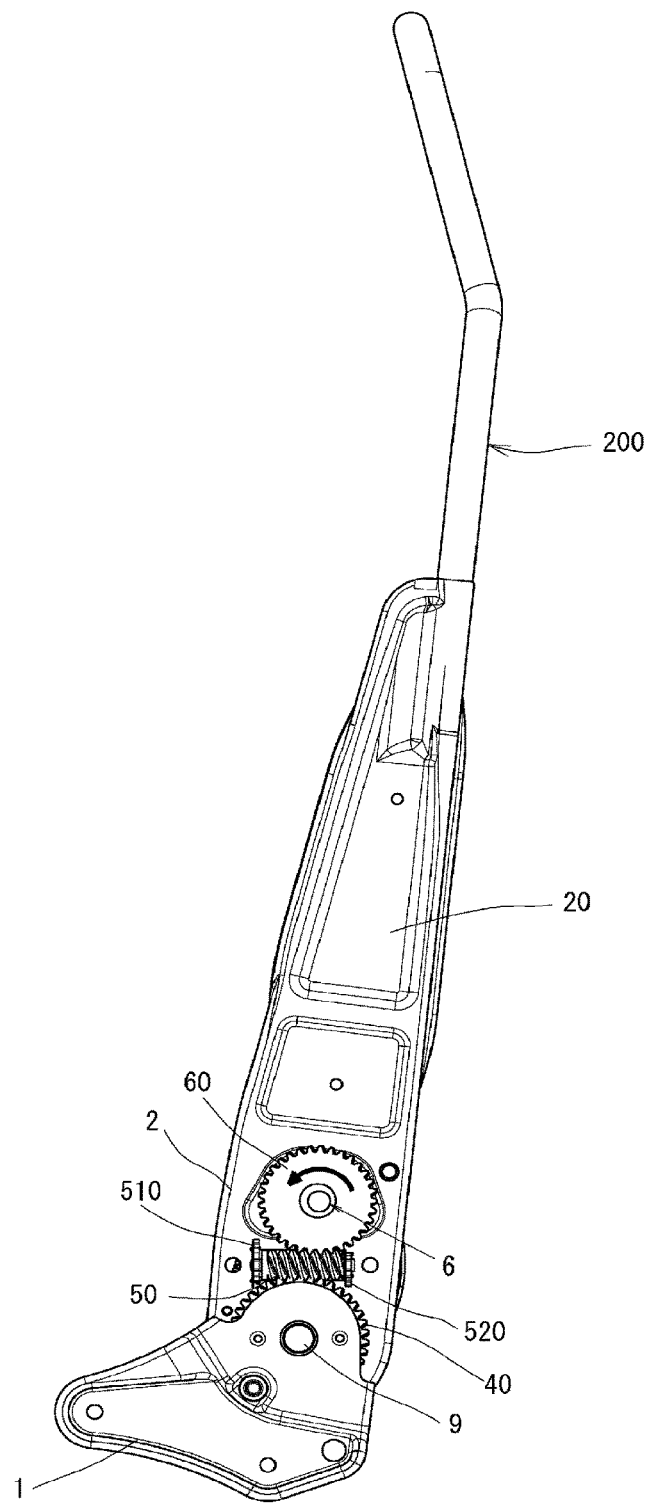
FIG. 7 is a diagram for explaining the movement of a driving worm wheel, a driven worm wheel, and the worm at the time of locking.
Figure 8:
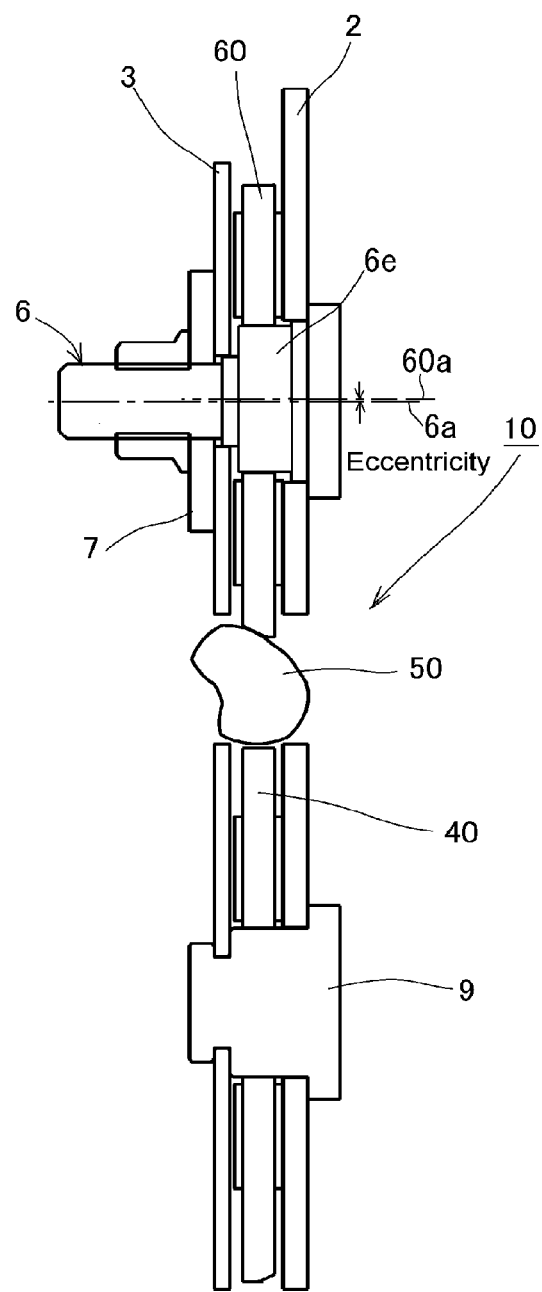
FIG. 8 is a diagram for explaining a center structure of an eccentric shaft.
Figure 9:
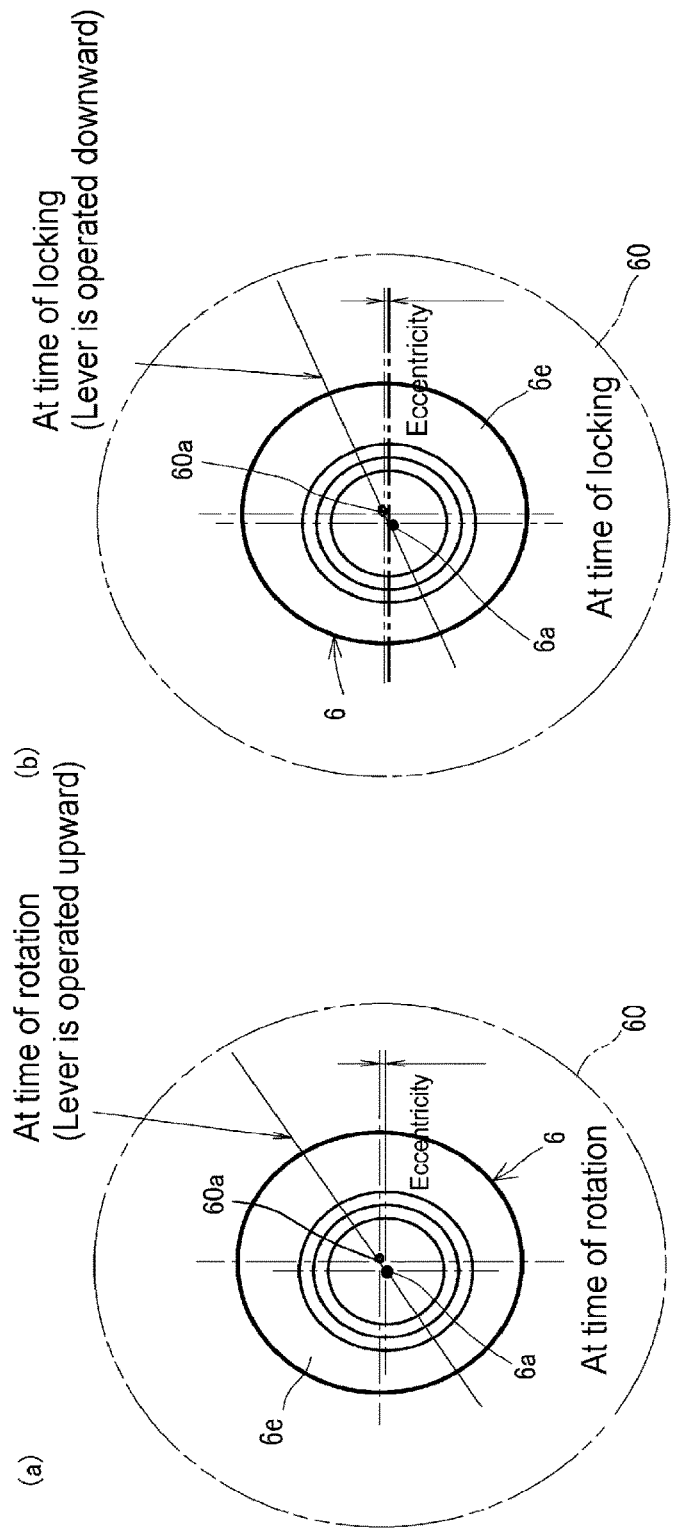
FIG. 9(a) and FIG. 9(b) are diagrams for explaining a positional relationship of the center of the eccentric shaft and the center of the driven worm wheel.

In an upper portion of the worm installment holes 2e, 3e of the back side attachment part 2 and the cover bracket 3, axis insertion holes 2f, 3f to which an eccentric shaft 6 is inserted are formed by penetrating (see FIG. 3). In between the back side attachment part 2 and the cover bracket 3, the driven worm wheel 60 that is a movable gear is installed so as to engage with the worm 50. This driven worm wheel 60 is installed so that the eccentric shaft 6 inserted to the axis insertion holes 2f, 3f becomes the rotation center. That is, as shown in FIG. 7 to FIG. 9, the driven worm wheel 60 is mounted to a large diameter part 6e that has a circular transverse cross section shape in the eccentric shaft 6. A center 6a of the eccentric shaft 6 is eccentric with respect to a center 60a of the driven worm wheel 60. The driven worm wheel 60 rotates with the eccentric position (the center 6a of the eccentric shaft 6) as a center. By the driving worm wheel 40 and the driven worm wheel 60 being arranged to be opposed to each other across the worm 50, a force corresponding to a mass of the driven worm wheel 60 is regenerated to the worm 50, and among a force in an axis core direction (tangent direction) applied to the worm 50 and a force in a direction that is substantially orthogonal to the axis core direction (substantially normal direction), the force in the substantially normal direction is cancelled. Thereby, whirling vibration of the worm 50 is eliminated and the rotation movement of the worm 50 becomes stable. Moreover, the rotation movement of the driven worm wheel 60 that engages with the worm 50, itself becomes stable. Thereby, these rotation movements become smooth. In order to make the act of the driven worm wheel 60 with respect to the worm 50 function sufficiently, the driven worm wheel 60 is preferably larger in mass than the worm 50.

Figure 2:
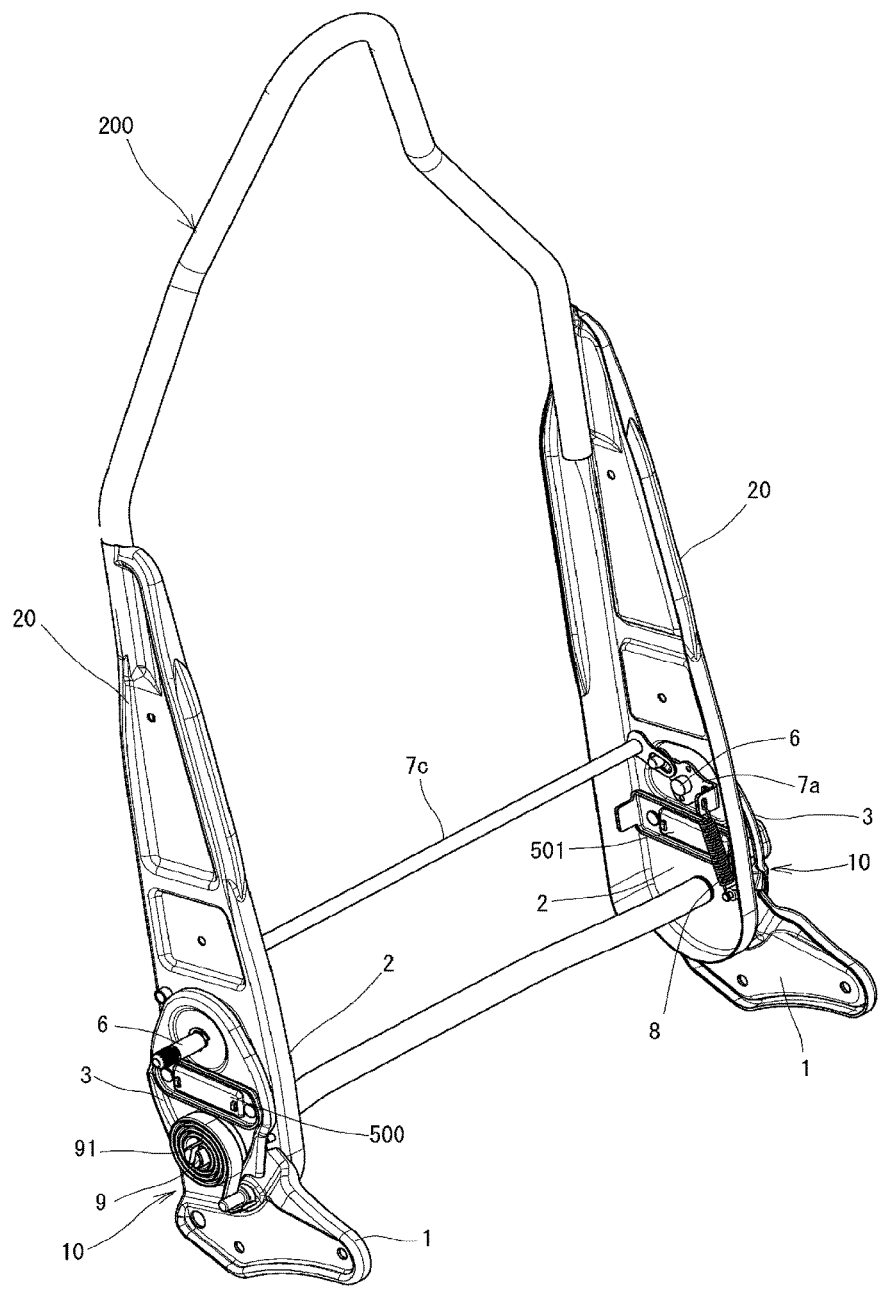
FIG. 2 is a perspective view viewed from left front of FIG. 1.

As shown in FIG. 1 to FIG. 3, the reclining adjuster 10 is provided at both sides of the back frame 200 and the cushion frame (cushion side bracket 1). A lever 7 that serves as an operation member is connected to a portion that protrudes in an outer surface of the cover bracket 3 in the one side of the eccentric shaft 6 (see FIG. 8). Lever brackets 7a, 7a connected to the eccentric shafts 6, 6, respectively are connected to inner sides of the back side attachment parts 2, 2 of the both side frames of the back frame. Return springs 8, 8 are engaged with these lever brackets 7a, 7a (see FIG. 1 to FIG. 3). Since the right and left lever brackets 7a, 7a are moved in synchronization, a connection rod 7c is bridged over both of the lever brackets 7a, 7a.

The back side attachment part 2 and the cover bracket 3 are formed with insertion holes 2h, 3h of a rotation axis 9 at a lower position than the worm installment holes 2e, 3e. At a position corresponding to the insertion holes 2h, 3h of the cushion side bracket 1, an insertion hole 1h of the rotation axis 9 is formed by penetrating. Accordingly, when the seat back (back frame 200) is inclined, the back side attachment part 2 and the cover bracket 3 rotate back and forth with respect to the cushion side bracket 1 with this rotation axis 9 as a center. The numeral reference 91 denotes a spiral spring that energizes the seat back forward.

Figure 10:
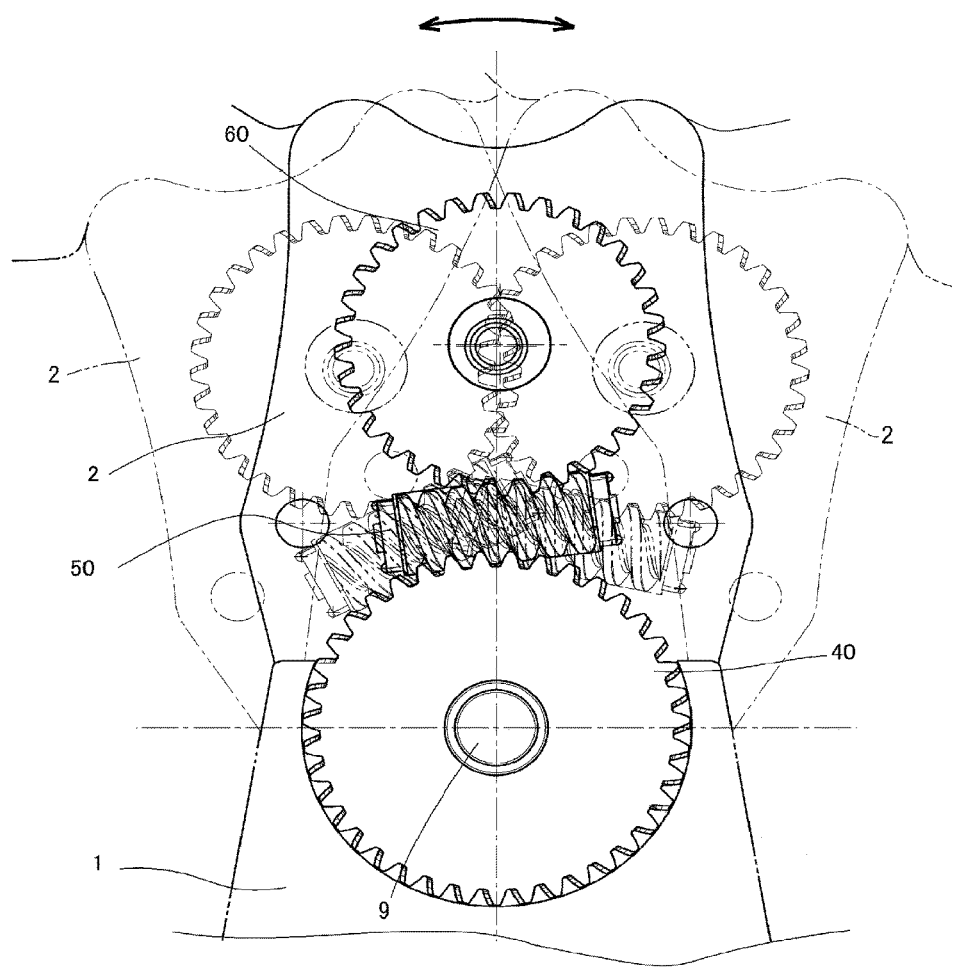
FIG. 10 is a diagram for explaining the movement of the driving worm wheel, the driven worm wheel, and the worm at the time of rotation.

Next, the effect of the present embodiment will be described. First, when the lever 7 is operated in a lock-released direction against the return spring 8, the eccentric shaft 6 rotates in one direction. Accordingly, the driven worm wheel 60 is pushed upward. Thereby, clearances between teeth of the driven worm wheel 60 and the worm 50, and between teeth of the worm 50 and the driving worm wheel 40 become suitable backlash that allows each rotation and a core is autonomously aligned. As shown in FIG. 10, when the seat back 200 is inclined forward or rearward, the back side attachment part 2 and the cover bracket 3 attempt to rotate forward and rearward with respect to the cushion side bracket 1 with the rotation axis 9 as a center as shown by a two-dot chain line in FIG. 10.

When the back side attachment part 2 and the cover bracket 3 rotate forward and rearward with respect to the cushion side bracket 1 as shown by the two-dot chain line in FIG. 10, the worm 50 rotates back and forth along with the back side attachment part 2 and the cover bracket 3. Since the worm 50 engages with the driving worm wheel 40, when the back side attachment part 2 and the cover bracket 3 move forward and rearward, the worm 50 rotates around the axis core while moving forward and rearward. In this regard, it can be considered that the worm 50 moves like a planetary gear with respect to the driving worm wheel 40. By the rotation of the worm 50, the driven worm wheel 60 rotates around the eccentric core axis 6. By these movement, inclining operation of the seat back can be performed.

The worm 50 rotates by being supported between the rotating fulcrums along the center line A by the pair of bearing parts 510, 520 as described above at the time of rotation (see FIG. 5(a)). Since the worm 50 rotates by the torque of the driving worm wheel 40, the worm 50 is set so that the angle of lead of the worm 50 becomes larger than a friction angle of the driving worm wheel 40 in this posture.

When lock is performed from the lock-released state, by detaching a hand operating the lever 7, due to the elastic force of the return spring 8, the lever 7 rotates. Then, the eccentric core axis 6 connected to the lever 7 rotates in a reverse direction from that described above. Since the rotation center 6a of the eccentric core axis 6 is eccentric from the center 60a of the driven worm wheel 60, the driven worm wheel 60 is rotated and is pushed against in the worm 50 direction. Thereby, clearances between teeth of both are reduced and the contact are between teeth is increased. Thus, the worm 50 is displaced forward in the axial direction, three gears 40, 50, 60 become unable to relatively rotate and are locked at the position, and the seat back is adjusted at a desired angle.

At this time, in the present embodiment, as described above, at the time of locking, when the worm 50 is displaced forward in the axial direction, the axis part 50a pushes the leaf spring 512 and the protruding part 511b engages with the groove portion 50c of the worm 50. Thereby, at the time of locking, one end portion side of the worm 50 is supported by the locking fulcrum and the other end portion side is supported by the rotating fulcrum, and the supports are performed along the locking axis line B. Thereby, the angle of lead of engagement between the worm 50 and each of the worm wheels 40, 60 is changed so as to be smaller at the time of locking than at the time of rotation (see FIG. 5(b)). As a result, in the present embodiment, compared with a structure of which fulcrum is not changed at the time of rotation and at the time of locking, even when the torque is input from the driven worm wheel 60, the worm 50 becomes harder to rotate and reliability of locking is increased.

Accordingly, the lock strength with respect to the load applied to the seat back becomes high and the prevention effect against the seat back gradually being inclined in the locked state is high. The angle of lead of engagement between the worm 50 and each of the worm wheels 40, 60 becomes small. That is, as shown in FIG. 5(c), the angle of lead at the time of input of the large load becomes smaller than that of when the fulcrum is not changed. As a result, when the large load is input to the seat back, since the component force in the horizontal direction applied to the driven worm wheel 60 becomes small, engagement with the worm 50 is easy to be maintained and it contributes to mitigating an impact of an occupant and improving escapability to the outside by maintaining the frame shape.

Figure 11:
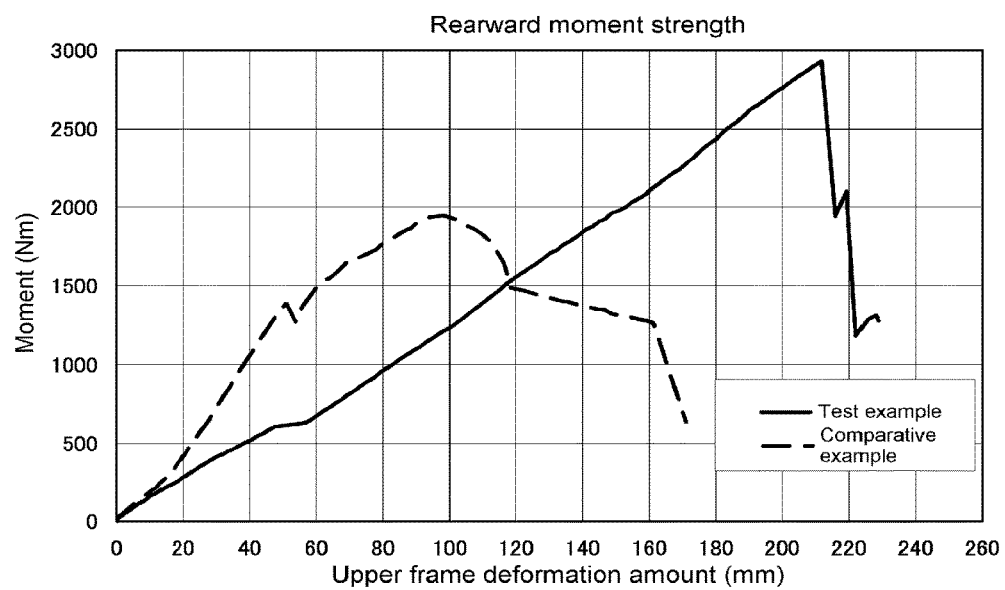
FIG. 11 is a diagram showing a test result of a back moment strength.
Figure 12:
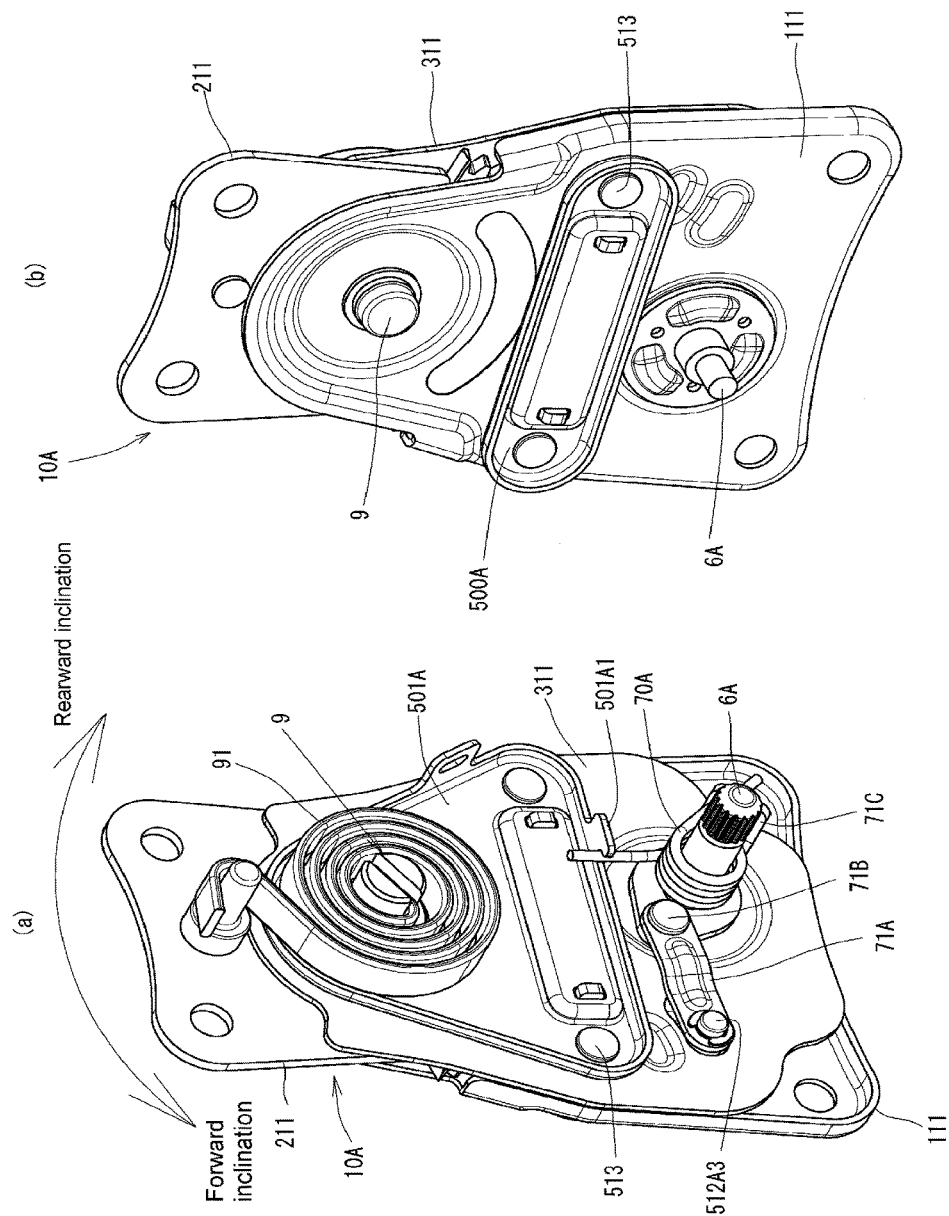
FIG. 12(a) is a perspective view viewed from one side showing a reclining adjuster according to the other embodiment of the present invention.
FIG. 12(b) is a perspective view viewed from the other side.
Figure 13:
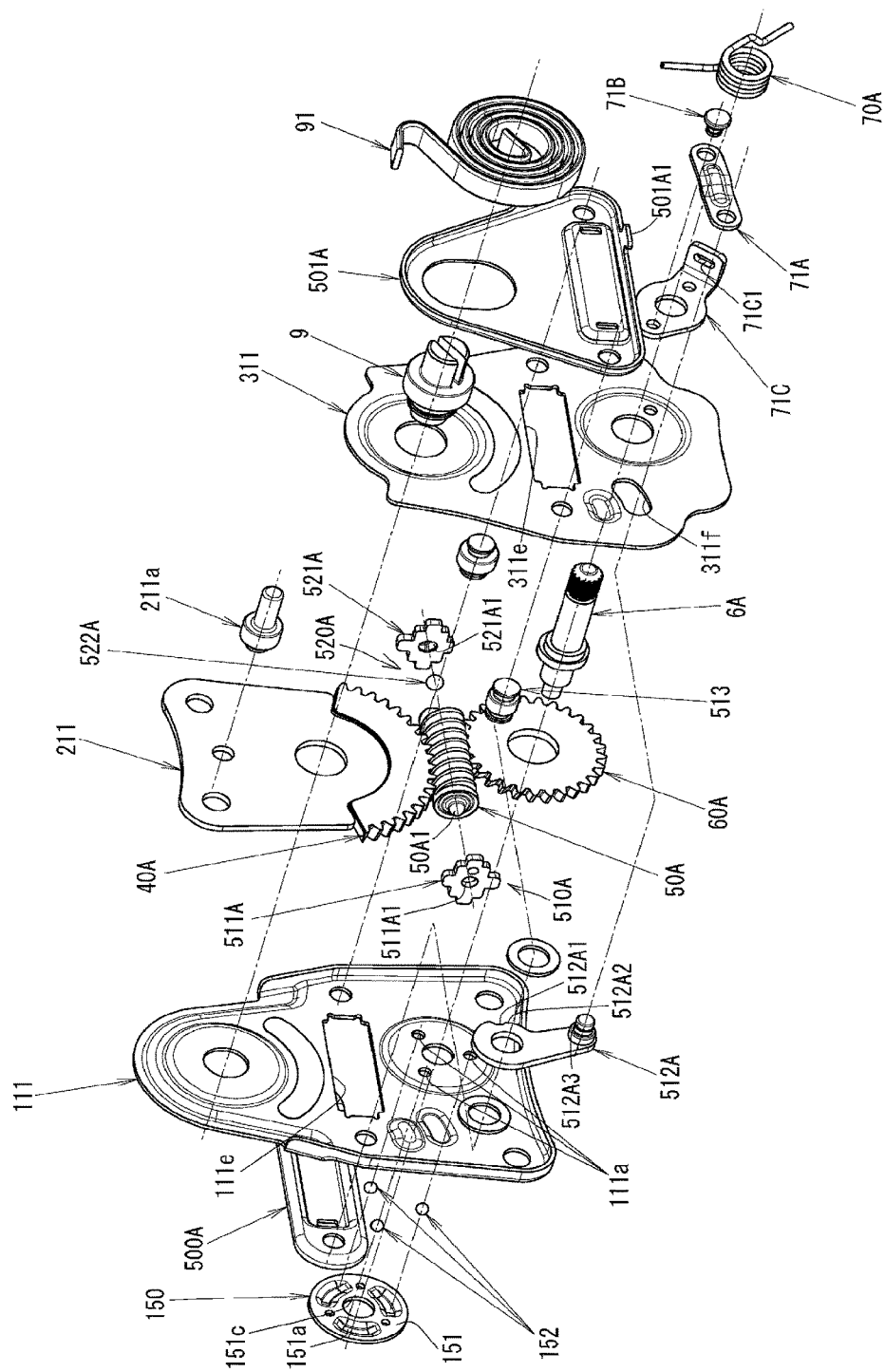
FIG. 13 is an exploded perspective view of FIG. 12.

FIG. 11 is a diagram showing a test result of a back moment strength measured by applying a strength rearward to the back frame in the seat frame (test example) attached with the reclining adjuster 10 of the embodiment described above. As shown in this drawing, the back moment strength is about 2900 Nm, is extremely high and is displaced almost linearly. It can be known that the teeth of the worm 50 of the reclining adjuster 10 and each of the worm wheels 40, 60 engage deeply and receive the strength integrally with the back frame. Accordingly, at the time of collision or the like, deformation of the back frame proceeds faster than the reclining adjuster 10. Thus, energy absorption due to deformation of the back frame can be smoothly functioned. In addition, the reclining adjuster 10 has high strength and engagement with the worm 50 is easy to be maintained as described above. Since fulcrum supporting the worm 50 is different at the time of locking and at the time of lock releasing, the degree of contribution to securing the escaping function of the occupant is high, naturally when the locking fulcrum is not damaged, but also high even if the locking fulcrum is damaged, as the fulcrum is changed to the rotating fulcrum by releasing the lock and inclination of the seat back is enabled. In the seat frame of the test example, the strength decreased due to the generation of buckling of the back frame in a slightly upper portion of the reclining adjuster 10 before the reclining adjuster 10 was damaged. However, when the reclining adjuster 10 was operated after the test, reclining can be operated by full stroke. FIG. 11 shows the back moment strength measured under the similar condition to the test example for the seat frame (comparative example) attached with a conventional inner teeth type recliner. In the case of the comparative example, the recliner was damaged faster than the seat frame, thereafter the seat frame was deformed, and the value of the back moment strength was low. Thus, the structure of the test example is superior in the back moment strength.

FIG. 12 to FIG. 15 are diagrams showing a reclining adjuster 10A that is a rotation movement control mechanism according to the other embodiment of the present invention. The reclining adjuster 10A of the present embodiment is configured so that a driving worm wheel 40A is provided in a back side bracket 211 side connected to the back frame that is a second member, and a driven worm wheel 60A and a worm 50A are provided in a cushion side bracket 111 that is a cushion frame side that is a first member.

Particularly, the back side bracket 211 is formed by using a steel material that is suitable for gear production. In the back side bracket 211, the driving worm wheel 40A is integrally formed so that teeth of the driving worm wheel 40A face downward. To the back side bracket 211, a rotation axis 9 is inserted. The rotation axis 9 is fixed to the cushion side bracket 111. A back frame including the back side bracket 211 is inclined forward and rearward with the rotation axis 9 as a center. To between the center of the rotation axis 9 and an engaging pin 211a provided in the back side bracket 211, a spiral spring 91 that is a balance spring is engaged.

In the cushion side bracket 111, the driven worm wheel 60A is provided rotatably, and the worm 50A is provided rotatably in an upper side of the driven worm wheel 60A. To the eccentric shaft 6A that supports the driven worm wheel 60A, an operation member (not shown) such as a lever is connected via a return spring 70A. Accordingly, the eccentric shaft 6A functions as a transfer axis that transfers a force of the operation member (this feature is similar in the embodiment described above).

The back side bracket 211 is installed between the cushion side bracket 111 and a cover bracket 311. In the cushion side bracket 111 and the cover bracket 311, worm installment holes 111e, 311e are formed, respectively. In between the cushion side bracket 111 and the cover bracket 311, the worm installment holes 111e, 311e are arranged with the worm 50A. Particularly, the axial direction of the worm 50A is arranged so as to be along the longitudinal direction of the worm installment holes 111e, 311e, the worm 50A is arranged so as to be able to engage with the driving worm wheel 40A and the driven worm wheel 60A. In each outer surface side of the cushion side bracket 111 and the cover bracket 311, the covers 500A, 501A are installed. The covers 500A, 501A cover a side surface of the worm 50A that faces outward from the worm installment holes 111e, 311e.

In the present embodiment, the driving worm wheel 40A is provided in the back side bracket 211 and the worm 50A and the driven worm wheel 60A are provided in the cushion side bracket 111 together. Thus, the driving worm wheel 40A rotates back and forth in an upper side of the worm 50A along with the back side bracket 211 around the rotation axis 9. When the driving worm wheel 40A rotates in this way, the worm 50A that engages with the driving worm wheel 40A rotates and further rotates the driven worm wheel 60A engaged with the worm 50A with the eccentric shaft 6A as a center.

In this way, the present embodiment has a configuration in which the driving worm wheel 40A that rotates the worm 50A is arranged in the upper side of the worm 50A and the force that rotates the worm 50A by the driving worm wheel 40A acts in a gravity direction of the worm 50A. That is, by the gravity of the worm 50A, backlash between the driving worm wheel 40A and the worm 50A always attempts to spread. Thus, the friction angle in design required for rotating the worm 50A by the rotation of the driving worm wheel 40A can be smaller than the type in which the driving worm wheel 40 is installed in the lower side of the worm 50 that has been described in the embodiment.

As shown in FIG. 5 and FIG. 6, in the embodiment described above, both end portions in the axial direction of the worm 50 are supported by the pair of bearing parts 510, 520 installed in both end portions of the worm installment holes 2e, 3e. Also in the present embodiment, it is similar that the worm 50A is supported the pair of bearing parts 510A, 520A. It is also similar that the other bearing part 520A that is a rear side of the seat is composed of a bearing holder 521A including a holder side bearing groove 521A1, and a ball 522A loaded between the holder side bearing groove 521A1 and a worm side bearing groove 50A2 of the worm 50A. However, the support structure of one bearing part 510A arranged in the front side of the seat is different.

That is, in the present embodiment, one bearing part 510A is configured to have the bearing holder 511A and the rotation control cam 512A and not have the leaf spring 512 shown in FIG. 5, FIG. 6, and the like that is used in the embodiment described above. The bearing holder 511A is provided with the bearing hole 511A1 extending through the substantially center portion in the thickness direction. In the substantially center portion of one end portion (front end portion) of the worm 50A, an axis part 50A1 provided so as to protrude forward is inserted to the bearing hole 511A1. A tip end of the axis part 50A1 protrudes outward from the bearing hole 511A.

The rotation control cam 512A is composed of a plate-shape member rotatably pivotally supported by a support axis 513 supported between the cushion side bracket 111 and the cover bracket 311 in a front of the seat of the axis part 50A1 of the worm 50A. A recess part 512A1 is formed in a rear side circumferential surface that is located closer to the rear side of the seat in the circumferential surface of the rotation control cam 512A. A protruding part 512A2 is formed so as to protrude rearward relatively, adjacent to the lower side of the recess part 512A1.

In the lower end portion of the rotation control cam 512A, the cam axis part 512A3 protrudes. In the cover bracket 311, a long hole 311f that opens so that a portion close to back is upward is formed. The cam axis part 512A3 protrudes from the long hole 311f to the outside. To the protruding part of the cam axis part 512A3, one end of a link plate 71A is connected. The other end of the link plate 71A is connected to a link axis 71B. The link axis 71B is connected to a lever bracket 71C connected to the eccentric shaft 6A. The lever bracket 71C is supported around the eccentric shaft 6A. The lever bracket 71C is energized by the return spring 70A of which one end is engaged to an engagement hole 71C1 of the lever bracket 71C and the other end is engaged to a protruding piece 501A1 of one cover 501A that covers the side surface of the worm 50A.

Figure 14:
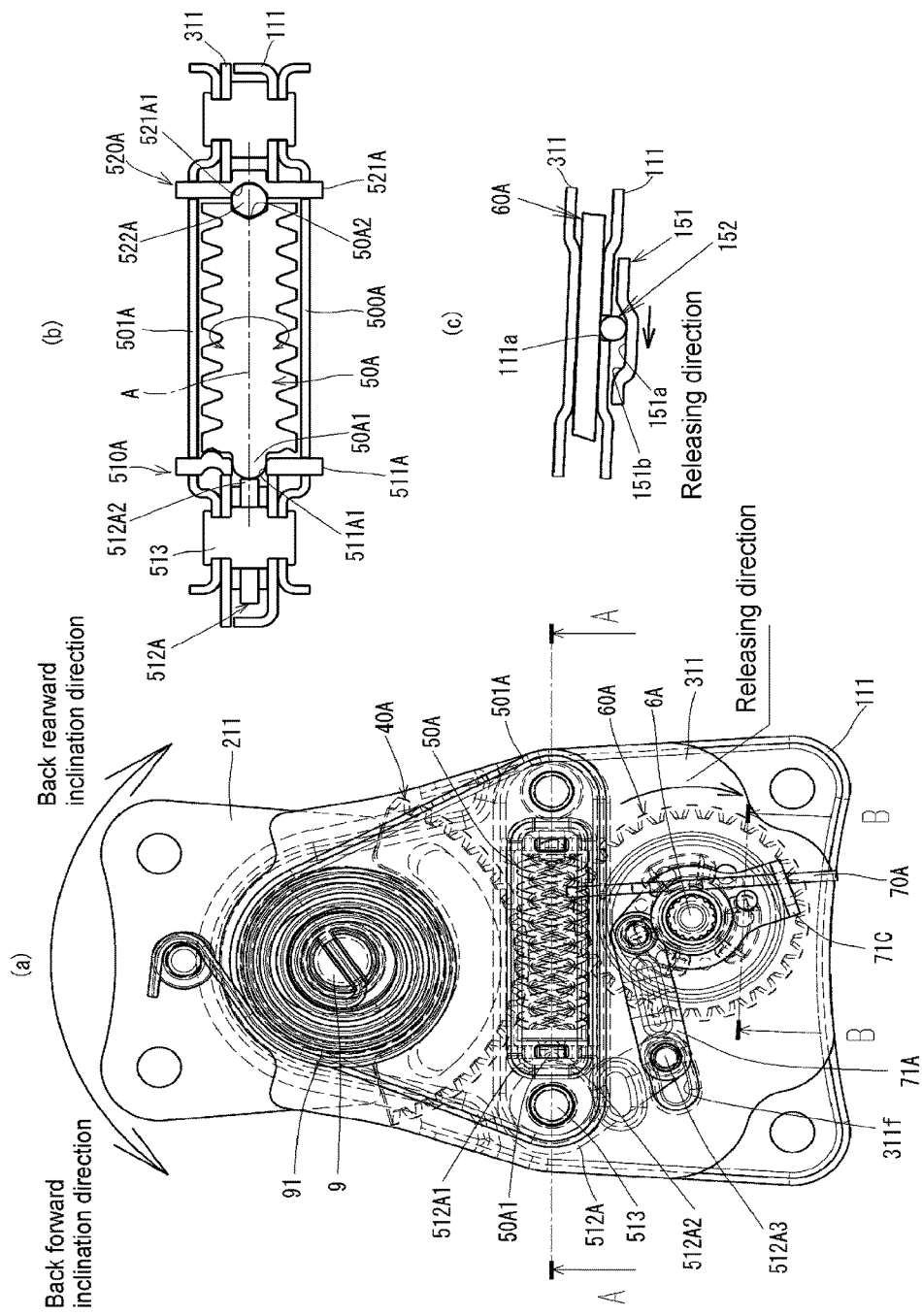
FIG. 14 is a diagram explaining an act at the time of lock-releasing of the other embodiment described above. (a) is a diagram viewed from a cover bracket side. (b) is a sectional view taken along A-A line of (a). (c) is a sectional view taken along B-B line of (a).

When an operation member (not shown) such as a lever is moved to a releasing direction shown by an arrow in FIG. 14(a) against an elastic force of the return spring 70A for the reclining movement, the cam axis part 512A3 rotates rearward in the long hole 311f via the link axis 71B and the link plate 71A. Thereby, the rotation control cam 512A rotates in a counterclockwise direction in FIG. 14(a) and the protruding part 512A2 is displaced to a position facing the axis part 50A1 of the worm 50A and contacts with a tip end surface of the axis part 50A1. Thereby, by the forward inclination and rearward inclination of the back frame, the worm 50A rotates smoothly with a center line A as a center connecting the axis part 50A1 and the ball 522 (see FIG. 14(*b*)).

Figure 15:
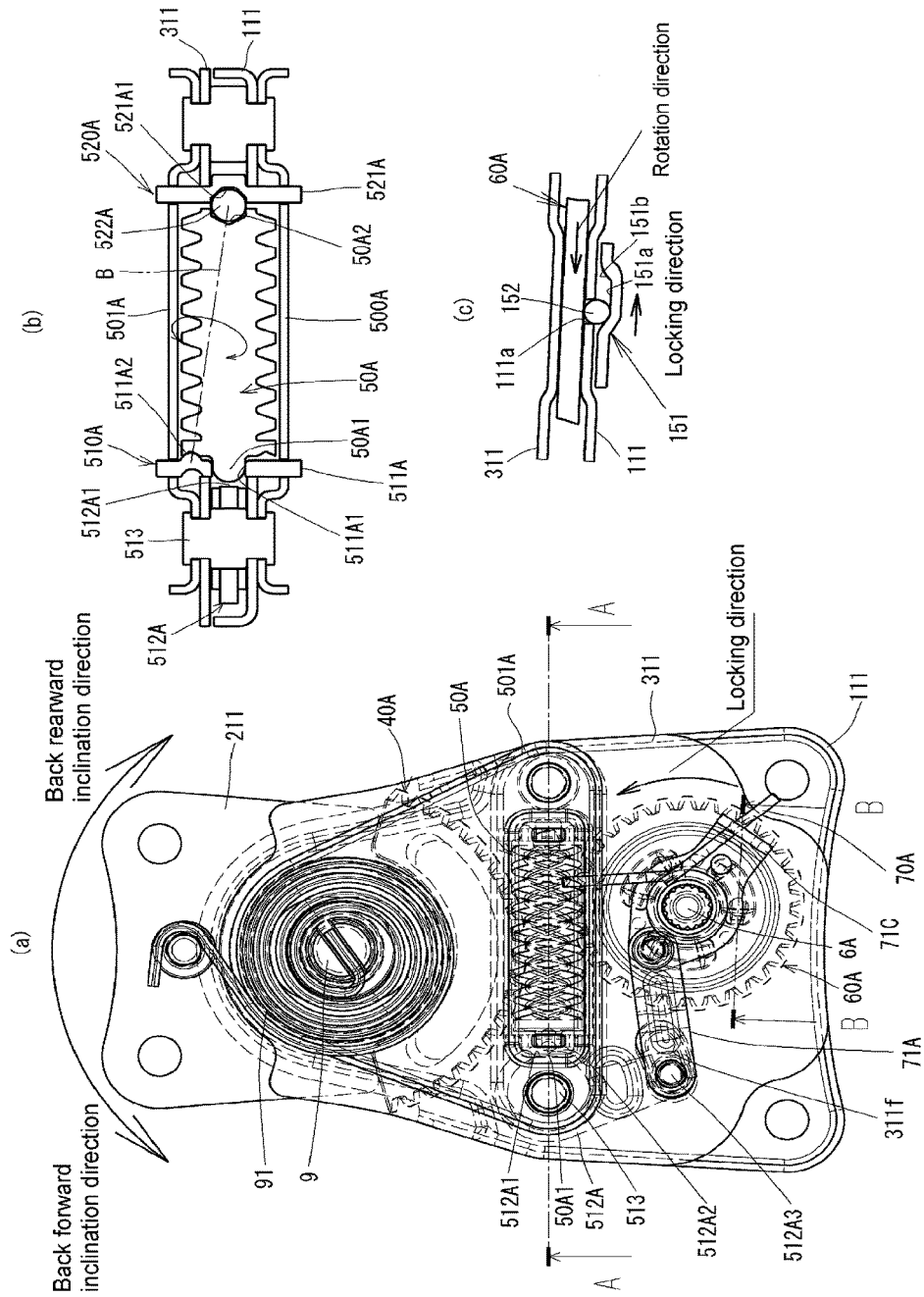
FIG. 15 is a diagram explaining an act of the other embodiment described above at the time of locking. (a) is a diagram viewed from the cover bracket side. (b) is a sectional view taken along A-A line of (a). (c) is a sectional view taken along B-B line of (a).

When the force that operates the operation member is released, by the elastic force of the return spring 70A, the lever bracket 71C rotates in the locking direction shown by the arrow in FIG. 15(*a*) and the cam axis part 512A3 rotates forward in the long hole 311*f* via the link axis 71B and the link plate 71A. Thereby, the rotation control cam 512A rotates in the clockwise direction in FIG. 15(*a*) and the recess part 512A1 is displaced to the position facing the axis part 50A1 of the worm 50A. As a result, as shown in FIG. 15(*b*), the tip end surface of the axis part 50A1 becomes in a state of not contacting with the rotation control cam 512A.

When locking is performed from the lock-released state, as described for the embodiment described above, the rotation center of the eccentric shaft 6A is eccentric from the center of the driven worm wheel 60A. Thus, the driven worm wheel 60A is rotated, while it is pushed in the worm 50A direction, and thereby, the worm 50A is displaced forward in the axial direction and the worm 50A is supported by the protruding part 511A2 and the ball 522A provided at the eccentric position of the bearing holder 511A along a locking axis line B (see FIG. 15(*b*)). At this time, in the present embodiment, the axis part 50A1 of the worm 50A does not contact with nothing. In the case of the embodiment shown in FIG. 1 to FIG. 10 described above, also at this time of locking, the axis part 50*a* of the worm 50 contacts with the leaf spring 512 (see FIG. 5 and FIG. 6). Thus, when a load is applied to the seat back repeatedly, depending on the degree of the load, the worm 50 rotates and seat back can be inclined. However, in the present embodiment, since the tip end portion of the axis part 50A1 of the worm 50A does not contact with the rotation control cam 512A at all, the rotation of the worm 50A in such a case where a large load is applied at the time of locking is prevented more than the embodiment described above.

In the present embodiment, a clutch plate 150 having a surface (opposite surface) 151 opposed to a surface of the driven worm wheel 60A is further provided. The clutch plate 150 is installed so that the opposite surface 151 faces the inner side, and the eccentric shaft 6A is fixed to the center hole 151*c* of the cushion side bracket 111 by welding or the like. In the opposite surface 151, groove portions 151*a* are formed in three positions with predetermined intervals in a circumferential direction. Each of groove portions 151*a* are formed with inclined surfaces 151*b* near each of the end portions in the circumferential direction. On the other hand, in the cushion side bracket 111, a ball 152 is supported by three hole portions 111*a* formed in correspondence with each of the groove portions 151*a*. This ball 152 protrudes in the groove portions 151*a*, is provided so as to be able to contact with the inclined surfaces 151*b*, and is provided so that a part of the ball 152 can protrude to the driven worm wheel 60A side from the hole portions 111*a*. In the present embodiment, this ball 152 composes the locking push member and the cushion side bracket 111 composes a member that supports the locking push member.

In the lock-released state, the clutch plate 150 rotates in one direction along with the rotation of the eccentric shaft 6A. At that time, as shown in FIG. 14(*c*), a ball 152 is maintained in correspondence with a flat portion other than the inclined surfaces 151*b* in the groove portions 151*a*. Thus, the ball 152 does not push the surface of the driven worm wheel 60A and the rotation of the driven worm wheel 60A is not prevented.

On the other hand, at the time of locking, the clutch plate 150 rotates at a predetermined angle by the rotation of the eccentric shaft 6A and the inclined surfaces 151*b* are located in correspondence with the ball 152 as shown in FIG. 15(*c*). Since the ball 152 is pushed by the inclined surfaces 151*b*, the ball 152 protrudes from the hole part 111*a* and is brought into pressure contact with the surface of the driven worm wheel 60A. Thereby, the force that maintains the driven worm wheel 60A not to rotate at the time of locking is further increased.

In the mechanism of the present embodiment, by a support means of the worm 50A and a means that presses the surface of the driven worm wheel 60A, a force that prevents the rotation of the worm 50A and the driven worm wheel 60A at the time of locking acts strongly as described above. Accordingly, the effect of preventing the inclination of the seat back due to the load input repeatedly forward and rearward of the seat back at the time of locking is high.

The support means of the worm 50A and the means that presses the surface of the driven worm wheel 60A in the present embodiment may be applied to the embodiment shown in FIG. 1 to FIG. 10 described above, naturally.

In the above description, description is performed on the premise of a manual type provided with an operation member (lever 7, and the like). However, the present invention can be applied to an electric type, naturally. As described in the embodiment, the rotation movement control mechanism of the present invention is typically used as a reclining adjuster of a seat. However, the mechanism can be used as a rotation movement part of a front-back lifter and a parallel lifter, and also as a substitute of a locking mechanism of a power unit motor, or the like. Application of the mechanism is not limited to a vehicle seat such as for an automobile and the mechanism can be applied to a seat of a train, an airplane, or the like.

EXPLANATION OF REFERENCES

1, 111 Cushion side bracket
2 Back side attachment part
211 Back side bracket
3, 311 Cover bracket
6, 6A Eccentric shaft
9 Rotation axis
10, 10A Reclining adjuster
40, 40A Driving worm wheel
50, 50A Worm
50*a*, 50A1 Axis part (Rotating fulcrum)
50*b*, 50A2 Worm side bearing groove (Rotating fulcrum)
50*c* Groove portion (Locking fulcrum)
510, 520, 510A, 520A Bearing part
511, 521, 511A, 521A Bearing holder
511*a*, 511A1 Bearing hole
511*b*, 511A2 Protruding part
512A Rotation control cam
521*a*, 521A1 Holder side bearing groove
522, 522A Ball
60, 60A Driven worm wheel
150 Clutch plate
151*a* Groove portion
151*b* Inclined surface
152 Ball

The invention claimed is:
1. A rotation movement control mechanism comprising:
a worm pivotally supported between a pair of bearing parts arranged in both end portions in an axial direction by any of a first member and a second member, so that the second member is controlled rotatably with respect to the first member and maintained at an appropriate rotation angle by the rotation movement control mechanism; and a driving worm wheel provided in one of the first member and the second member and a driven worm wheel provided in the other of the first member and the second member, so as to engage with the worm in a positional relationship across the worm, when the first member and the second member are rotated relative to one another, the worm engaged with the driving worm wheel rotates and the driven worm wheel engaged with the worm also rotates, wherein at the time of locking, the driven worm wheel is moved in a direction of being pushed against the worm, and thereby locking can be performed in a state where backlash between both is reduced, wherein the rotation movement control mechanism has rotating fulcrums that are provided in both end portions in the axial direction and are fulcrums in rotation of the worm, and a locking fulcrum provided in a different position from the rotating fulcrums in one end portion in the axial direction, at the time of rotation, each of the rotating fulcrums of both end portions in the axial direction is supported by the pair of bearing parts, wherein at the time of locking, by the worm being displaced in the axial direction according to the movement of the driven worm wheel in the direction of being pushed against the worm, the locking fulcrum is supported in one end portion in the axial direction and the rotating fulcrums are supported in the other end portion in the axial direction, by the pair of bearing parts, and wherein the rotation movement control mechanism has a structure in which an angle of lead of the worm at the time of locking is changed to be smaller than an angle of lead at the time of rotation.

2. The rotation movement control mechanism according to claim 1, wherein each of the rotating fulcrums of the worm are provided in a center position of both end portions in the axial direction, and the locking fulcrum is provided at an eccentric position in one end portion in the axial direction.

3. The rotation movement control mechanism according to claim 1, wherein the mechanism has a groove portion formed circumferentially in a periphery of a rotating fulcrum provided in the one end portion in the axial direction of the worm, a protruding part that protrudes in the groove portion direction is formed in an eccentric position of the one bearing part arranged in the one end portion side in the axial direction, and the locking fulcrum is any of portions of the groove portion with which the protruding part contacts.

4. The rotation movement control mechanism according to claim 1, wherein the one bearing part arranged in the one end portion side in the axial direction of the worm has an elastic part that elastically supports the rotating fulcrums, by the worm being displaced in the axial direction at the time of locking, the elastic part is bent in the axial direction, and thereby, a support position by the one bearing part in the one end portion in the axial direction of the worm is changed from the rotating fulcrums to the locking fulcrum.

5. The rotation movement control mechanism according to claim 1, wherein the one bearing part arranged in the one end portion side in the axial direction of the worm has: a bearing holder that has a through hole from which tip end portions of the rotating fulcrums can protrude outward; and a rotation control cam formed to be a shape that contacts with the tip end portions of the rotating fulcrums protruding from the through hole at the time of rotation of the worm and separates from the tip end portions at the time of locking.

6. The rotation movement control mechanism according to claim 1, having a locking push member that pushes a surface of the driven worm wheel at the time of locking.

7. The rotation movement control mechanism according to claim 6 including a clutch plate that has an inclined surface formed in a surface opposed to at least one surface of the driven worm wheel, wherein a member installed between the driven worm wheel and the clutch plate supports the locking push member, when the clutch plate rotates at the time of locking, the locking push member is brought into press contact with the opposite surface of the driven worm wheel by the inclined surface.

8. The rotation movement control mechanism according to claim 1 configured so that the driven worm wheel is rotatably supported via an eccentric shaft with an eccentric position from a center position of the driven worm wheel as a rotation center, and when the eccentric shaft is rotated, the driven worm wheel is pushed against the worm, and thereby backlash between both is reduced and the transfer of a torque is limited.

9. The rotation movement control mechanism according to claim 1, wherein the driven worm wheel has a larger mass than that of the worm, and a force corresponding to the mass of the driven worm wheel acts to the worm, and prevents whirling vibration of the worm.

10. The rotation movement control mechanism according to claim 1, wherein the first member and the second member are two members that relatively rotate in a plurality of members composing a seat and, the mechanism is used for the seat.

11. The rotation movement control mechanism according to claim 10, wherein the first member is any of members composing a frame of a seat cushion, the second member is any of members composing a frame of a seat back, and the mechanism is used as a reclining adjuster that adjusts an inclination angle of the seat back with respect to the seat cushion.

12. A seat comprising a seat cushion and a seat back, the seat being characterized in that the rotation movement control mechanism according to claim 1 is provided between two members that relatively rotate in the plurality of members composing the seat.

13. The seat according to claim 12, wherein the rotation movement control mechanism is provided as a reclining adjuster between any of the members composing the frame of the seat cushion and any of the members composing the frame of the seat back.

* * * * *

UNITED STATES PATENT AND TRADEMARK OFFICE
CERTIFICATE OF CORRECTION

PATENT NO. : 10,179,523 B2
APPLICATION NO. : 15/519427
DATED : January 15, 2019
INVENTOR(S) : Kiyonori Umezaki et al.

Page 1 of 1

It is certified that error appears in the above-identified patent and that said Letters Patent is hereby corrected as shown below:

On the Title Page

Item (22), the PCT filing date is incorrect. Item (22) should read:
--(22) PCT Filed: Oct. 16, 2015--

Signed and Sealed this
Fourteenth Day of January, 2020

Andrei Iancu
*Director of the United States Patent and Trademark Office*